US010733685B1

(12) United States Patent
Gailloux et al.

(10) Patent No.: US 10,733,685 B1
(45) Date of Patent: Aug. 4, 2020

(54) PRIVATE INFORMATION DISCLOSURE CONSENT MANAGEMENT SYSTEM

(71) Applicant: Sprint Communications Company L.P., Overland Park, KS (US)

(72) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 1179 days.

(21) Appl. No.: 14/750,723

(22) Filed: Jun. 25, 2015

(51) Int. Cl.
*H04W 8/18* (2009.01)
*G06Q 50/26* (2012.01)
*G06Q 30/06* (2012.01)
*H04M 3/493* (2006.01)

(52) U.S. Cl.
CPC ....... *G06Q 50/265* (2013.01); *G06Q 30/0613* (2013.01); *H04M 3/4936* (2013.01); *H04W 8/183* (2013.01)

(58) Field of Classification Search
CPC ............ G06Q 50/265; G06Q 30/0613; H04M 3/4936; H04W 8/183
USPC .......................................................... 705/50
See application file for complete search history.

(56) References Cited

U.S. PATENT DOCUMENTS

| 7,076,558 | B1 | 7/2006 | Dunn | |
| 8,656,465 | B1* | 2/2014 | Fong-Jones | G06F 21/6281 713/165 |
| 9,443,106 | B2* | 9/2016 | Janakiram | G06F 21/629 |
| 2012/0208503 | A1 | 8/2012 | Johansson | |
| 2013/0097517 | A1* | 4/2013 | Reiss | G06F 21/54 715/741 |
| 2013/0111545 | A1 | 5/2013 | Sharma et al. | |
| 2013/0150115 | A1* | 6/2013 | Maggenti | H04M 1/656 455/518 |
| 2014/0007184 | A1* | 1/2014 | Porras | G06F 21/53 726/1 |
| 2015/0237044 | A1* | 8/2015 | Gupta | G06F 21/34 726/9 |

* cited by examiner

*Primary Examiner* — James D Nigh

(57) ABSTRACT

In an embodiment, a user equipment (UE) is disclosed. The UE comprises a cellular radio transceiver, a non-transitory memory, a processor, a third party application stored in the non-transitory memory, and an application stored in the non-transitory memory. When executed by the processor, the third party application causes the processor to attempt to access confidential information of the UE. When executed by the processor, the application causes the processor to determine a status of consent to release confidential information to the third party application and to take action in response to a determination that the status of consent is consent is not granted to release confidential information to the third party application.

19 Claims, 7 Drawing Sheets

PRIVATE INFORMATION DISCLOSURE CONSENT MANAGEMENT SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A smart phone may download and install third party applications, for example mobile applications that are made by mobile application developers not managed by an original equipment manufacturer (OEM) of the smart phone or by a wireless communication service provider of wireless communication service to the smart phone. During installation or during execution, a third party application may ask a user of the smart phone to grant consent for the third party application to access and use confidential and/or private information associated with the user and/or the smart phone. For example, the third party application may request consent to look-up a physical location of the smart phone, to read from a contacts list of the smart phone, and/or to send information from the smart phone to the Internet. A developer or owner of the third party application desirably maintains records of consents obtained from users of smart phones, for example to comply with government regulations or best industry practices.

Individuals may provide consent to use their confidential and/or private information to third parties in other circumstances. For example, a car buyer may provide consent to a car dealer to access his or her confidential information to assess a creditworthiness of the buyer. A credit card applicant may provide consent to a financial institution to access his or her confidential information to assess the creditworthiness of the applicant. A consumer completing an on-line Internet retail purchase may provide consent to the on-line retail enterprise to store credit card and shipping information of the consumer. A prescription drug consumer may provide consent to a pharmacy, via an interactive voice recognition (IVR) system, to send unsolicited communications to a mobile phone or an email account associated with the consumer, for example to notify the consumer of prescription drug refill schedules or of sales promotions. Sometimes consent agreements contain a time limit constraint, limiting the validity of the consent to a delimited period of time. Other consent agreements may contain no time limit constraints and remain valid until explicitly cancelled by the individual.

SUMMARY

In an embodiment, a user equipment (UE) is disclosed. The UE comprises a cellular radio transceiver, a non-transitory memory, a processor, a third party application stored in the non-transitory memory, and an application stored in the non-transitory memory. When executed by the processor, the third party application causes the processor to attempt to access confidential information of the UE. When executed by the processor, the application causes the processor to determine a status of consent to release confidential information to the third party application and to take action in response to a determination that the status of consent is consent is not granted to release confidential information to the third party application.

In an embodiment, a confidential information release consent management system is disclosed. The system comprises a processor, a non-transitory memory, and an application stored in the non-transitory memory. When executed by the processor, the application causes the processor to receive consent records from a plurality of third parties, wherein each consent record relates to a consent by a consenting party to release confidential information from a user equipment (UE) of the consenting party to the third party and comprises three or more of an identity of the consenting party, an identity of the third party, a timestamp of a consent event, an identity of a version of a consent agreement, a universal reference locator (URL) that is a link to a text of the consent agreement, and a time limit during which the consent is valid. The application further causes the processor to store the consent records in a data store, receive a request to review consent records associated with a first consenting party, and retrieve a plurality of consent records associated with the first consenting party stored in the data store. The application further causes the processor to transmit the plurality of consent records associated with the first consenting party, receive a request from the first consenting party to cancel a first consent identified in a first one of the plurality of consent records associated with the first consenting party, and send a command to a third party identified in the first consent record to cancel the consent identified in the first consent record.

In an embodiment, a method of a consent management hub server managing records of consent to release confidential information to third parties is disclosed. The method comprises receiving consent records from third parties by a consent management hub server, wherein each consent record relates to a consent by a consenting party to release confidential information to the third party and comprises three or more of an identity of the consenting party, an identity of the third party, a timestamp of a consent event, a version of a consent agreement, a universal reference locator (URL) that is a link to a text of the consent agreement, and a time limit during which the consent is valid. The method further comprises storing the consent records by the consent management hub server in a data store and mediating access to the consent records by the consent management hub server via an application programming interface provided by the consent management hub server for third parties and owners of the confidential information to access the consent records.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
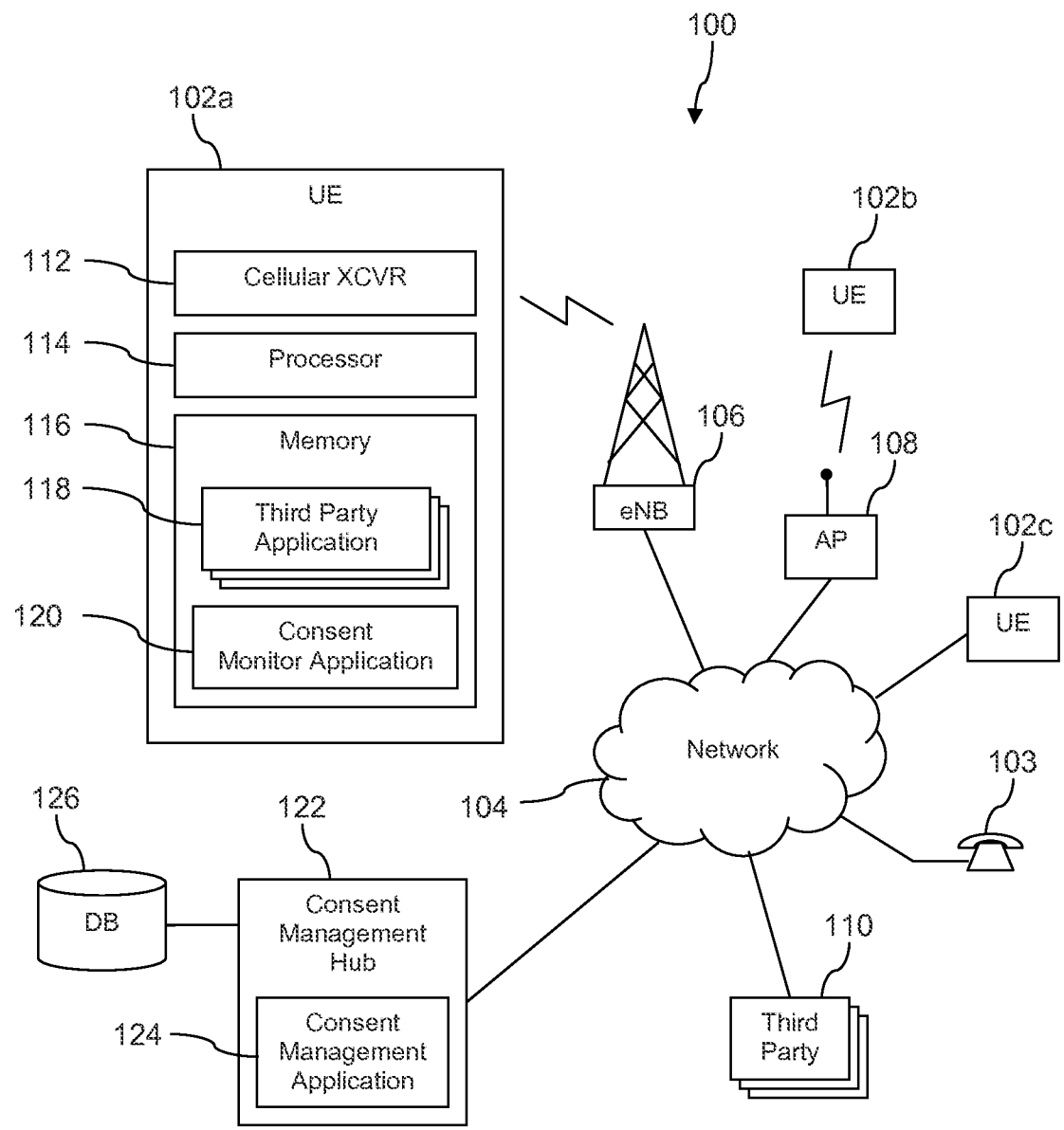
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for managing consents provided by owners of confidential information to one or more third parties. These consents may be provided in a variety of situations and relate to granting access to a variety of confidential and/or private information. For example, a user of a smart phone may consent, while downloading a third party application to his or her smart phone, to share the physical location of the smart phone with the third party application. A user of a laptop computer or a desktop computer may consent, while completing a purchase transaction using a web interface of an on-line retail enterprise, to the on-line retail enterprise storing his or her credit card information and/or shipping address. A concerned citizen may consent, while calling a political action hotline, to share his or her contact information with a plurality of undefined other organizations loosely characterized as affiliated with the political action group. A prescription drug user may consent, while refilling a prescription through an interactive voice recognition (IVR) system, to a pharmacy sending text messages to his or her smart phone when a prescription is ready for pick-up and to receive other undefined notifications of a promotional nature. Over time, an information owner may accumulate a large number of consents to share his or her confidential and/or private information. It may be difficult for the information owner to remember what consents he or she has granted, when or if they expire, and to whom the consents were granted.

Third parties that request and receive consents to access confidential and/or private information from information owners may maintain a record of those consents. Various government regulations and/or best commercial practices may oblige them to manage these consents in specific ways. For example, when an information owner changes the wireless communication service provider of his or her smart phone, a third party may be obliged to discard previous consents granted by that information owner. This process may prevent the third party from contacting the information owner to prompt him or her to renew the defunct consent, because the former consent of the information owner for the third party to contact him or her is now defunct. Third parties, too, may accumulate a large number of consents which become a challenging data management task.

The system taught by the present disclosure provides a central hub for managing consents provided by information owners. When an information owner provides a consent to a third party, the third party may invoke an application programming interface (API) of a consent management hub to create a consent record. The consent record may comprise three or more of an identity of the information owner, an identity of the third party, an identity of the version of the consent, a link to the literal text of the consent agreement that the information owner consented to, a timestamp of the consent event, and a consent time limit. In some cases, collaboration of the third party with the consent management hub may be mandated by government regulation or by best commercial practices. In other cases, collaboration of the third party with the consent management hub may be imposed on the third party as a precondition of access to the information owner via a gateway entity, such as a wireless communication service provider who imposes this precondition on third party application developers desiring their mobile applications to be distributed via an application store managed by the service provider.

The consent management hub provides an interface that may be accessed by information owners to review and manage his or her consents. The information owner may use the interface to revoke consents he or she has granted previously. The information owner may use the interface to extend previously granted consents to third parties when the information owner switches from a first wireless communication service provider to a second wireless communication service provider (in some circumstances it is customary or mandated for third parties to discard previously granted consents when an information owner changes wireless service provider). The information owner may use the interface to review and manage consents according to information access classes, such as consents granting access to a current location of a smart phone associated with the information owner, consents granting access to hardware devices of the smart phone, consents granting access to transmit to the Internet or to a wireless network, consents granting permission to send unsolicited promotional notifications to the information owner, consents granting access to a contacts function of a smart phone associated with the information owner. The information owner may use the interface to review and manage consents according to third party classes, such as internet commerce enterprises, mobile application providers, wireless communication service providers, and financial institutions.

The information owner may use the interface of the consents management hub to review and modify multiple consents possibly associated with multiple different third parties with one step. For example, the information owner may cancel or revoke all consents to third parties for accessing a contacts list of the information owner. The information owner may use the interface of the consents management hub to drill down from a comprehensive view of his or her granted requests to find a specific consent granted to a specific third party and cancel or revoke that specific consent.

A third party may use the interface of the consents management hub to identify time based consents that are about to expire. The third party may then send a request to the subject smart phone prompting the information owner to refresh the time based consent. The third party may send a request to an information owner to agree to an expansion of previously granted consent, for example granting the third party access to additional functions or data types of a smart phone. Additionally, the third party may send a request to receive all consent records related to consents granted by a specific information owner to the specific third party, for example when the information owner has changed wireless service provider. This may promote the third party deleting those consents from its data store in response to a changed service provider. The information from the consent management hub may act as a back-up or confirmation of the third party's own understanding of consents granted by the information owner.

In an embodiment, a consent monitor application is installed in a smart phone of an information owner. The consent monitor application may monitor the access of third party applications to APIs provided by system functions such as a self-location function of the smart phone, a contacts function of the smart phone, a wireless communication interface of the smart phone, a camera of the smart phone, a microphone of the smart phone, and other functions. The consent monitor application may maintain a record of consents granted to third party applications installed on the smart phone. The consent monitor application may compare the attempts by a third party application to access system function with the consents granted to that third party. If the third party application attempts to exceed the consents granted to it, the consent monitor application takes action. That action may include blocking access of the third party application to the subject system function. Alternatively, the action may include providing some notification or report of the third party accessing the subject system function. For example, the consent monitor application may pop-up a dialog box in the area of the third party application on a display screen of the smart phone associated with the information owner, where the dialog box describes the access being conducted by the third party application and prompting the user to approve an appropriate consent, to interrupt the access, or to allow the access this time.

The consent monitor application may provide an interface for an information owner to consent to grant access to a function to a third party application while configuring the consent monitor application to present a notification message on the smart phone every time the third party application performs the subject access, possibly providing contextual information about what the third party application is doing when it performs the access. The consent monitor application may provide an option for the information owner or user to select when consenting to grant access to suspend the subject third party application and wait for the information owner or user to approve again the subject access. When the information owner reaffirms consent, a message may be sent from the smart phone to the consent management hub to be stored in a consent record and/or sent to the third party.

Turning now to FIG. 1, a communication system 100 is described. In an embodiment, the system 100 comprises a plurality of user equipments (UEs) 102, a communication network 104, an enhanced node B (eNB) 106, an access point 108, and a plurality of third party organizations or enterprises 110. The network 104 is one or more public communication networks, one or more private communication networks, or a combination thereof. A first UE 102a may be communicatively coupled with the network 104 through the eNB 106. A second UE 102b may be communicatively coupled with the network 104 through the access point 108. A third UE 102c may be communicatively coupled to the network 104 through a wired connection, for example through a router or modem. The UEs 102 may be smart phones, personal digital assistants (PDAs), media players, wearable computers, headset computers, laptop computers, tablet computers, notebook computers, or desktop computers. It is understood that system 100 may comprise any number of UEs 102, any number of eNBs 106, any number of access points 108, and any number of third parties 110.

The first UE 102a may comprise a cellular transceiver 112, a processor 114, and a memory 116. The memory 116 may be referred to as a non-transitory memory in some contexts. A plurality of third party applications 118 may be stored in the memory 116. In an embodiment, a consent monitor application 120 may be stored in the memory 116. The UE 102a may establish a wireless communication link between the cellular transceiver 112 and the eNB 106 according to a long term evolution (LTE), a code division multiple access (CDMA), a global system for mobile communications (GSM), worldwide interface for microwave access (WiMAX), or another wireless telecommunication protocol. In some contexts, the eNB 106 may be referred to as a base transceiver station (BTS) or a cell tower.

The second and third UEs 102b, 102c may comprise some of the same components as the first UE 102a and may comprise other components not present in the first UE 102a. For example, the second UE 102b may comprise a short range wireless radio transceiver, for example a WiFi transceiver, that communicates with the access point 108. In an embodiment the second UE 102b does not have a cellular transceiver; in another embodiment, the second UE 102b does have a cellular transceiver. The third UE 102c may be a desktop computer or workstation. The third UE 102c may be communicatively coupled by wires or coaxial cable to a router or to a data communication hub or gateway, and the router may communicatively couple the third UE 102c to the network 104. In some contexts, the router, hub, or gateway that communicatively couple the third UE 102c to the network 104 may be considered parts of the network 104.

A user of the first UE 102a may download and install the third party applications 118, for example downloading from an application store managed by a wireless communication service provider that provides wireless communication service to the first UE 102a. Some of the third party applications 118 may be downloaded from other sources not associated with the wireless service provider. The third party applications may be said to be developed or distributed by third parties 110, for example by mobile application providers.

Some of the third party applications 118 may prompt the user of the first UE 102a, for example during installation and/or during execution, to grant consent for the third party application 118 to access sensitive information, for example confidential information and/or private information. The user may be referred to as the owner of the confidential information and/or the owner of the private information. The confidential information may be the current location of the first UE 102a (and hence the location of the user); a list of contacts, the phone number of the contacts, and the email addresses of the contacts; and a photographs directory. A third party application 118 may prompt the user to grant consent to the third party application 118 to execute commands on the first UE 102a, for example to transmit messages via the cellular transceiver 112 via the eNB 106 to the network 104; to use application programming interfaces (APIs) of the first UE 102a to execute commands such as turning on a microphone or turning on the camera of the first UE 102a. A third party application 118 may prompt the user to grant consent to make purchases electronically while executing the application (e.g., in-app purchases).

A user of a UE 102 (e.g., any of UEs 102a, 102b, or 102c) may use a browser to access an on-line retail web site and purchase goods or services. The on-line web site and/or the business that provides the on-line web site may likewise be referred to as a third party 110. The web site may prompt the user to grant consent for the on-line retail web site to store confidential information about the user or the purchase transaction. The third party 110 may prompt the user to grant consent to the on-line web site to store credit card information of the user, to store a shipping address of the user, to store a history of the transaction, to store a history of goods or services viewed by the user while visiting the web site, and to send emails to the user to notify them of promotions. The third party 110 may prompt the user to grant permission to contact the user via email, phone call, text message, or otherwise.

An individual may use a telephone 103 to phone a business or enterprise which may be referred to as a third party 110. The business or enterprise may be a pharmacy, a car dealership, an airline, or other business. During the call, the individual may be prompted to grant consent to the third party 110 to store confidential information of the user or to contact the user. In some cases, the individual may communicate with an interactive voice recognition (IVR) system during the call, and the consent may be solicited and granted during the IVR interaction.

Users may have difficulty remembering all the consents they grant to third parties 110 from any of the UEs 102 or the telephone 103. Likewise, third parties 110 may have difficulty managing the granted consents and abiding by the terms of the agreements that articulate what the user has consented to. Consent agreements may change over the course of time. Consent agreements may contain time limit constraints or time duration limits. For example, a user may grant consent to a third party 110 to store confidential information for 6 months, for a year, or for 18 months. When a user changes wireless communication service provider, the third parties 110 may be obliged, by government regulation or best commercial practices, to discard the consent of the user. One of the consents discarded may be consent of the user to contact the user, so the third party 110 wouldn't have consent to contact the user and prompt them to renew the former consent now that the user has migrated their wireless service of his or her UE 102 to a new service provider. Also, while the description above speaks of a user, it is understood that the third parties 110 may be managing millions, tens of millions, or hundreds of millions of consents from users.

The system 100 further comprises a consent management hub 112. The hub 112 may be a server computer that executes a consent management application 124. Computers are discussed further hereinafter. The third parties 110 and/or the third party applications 118 may send a consent record to the hub 122 and to the consent management application 124 when a user grants consent. The consent management application 124 may store the consent records in a data store 126.

Figure 2:
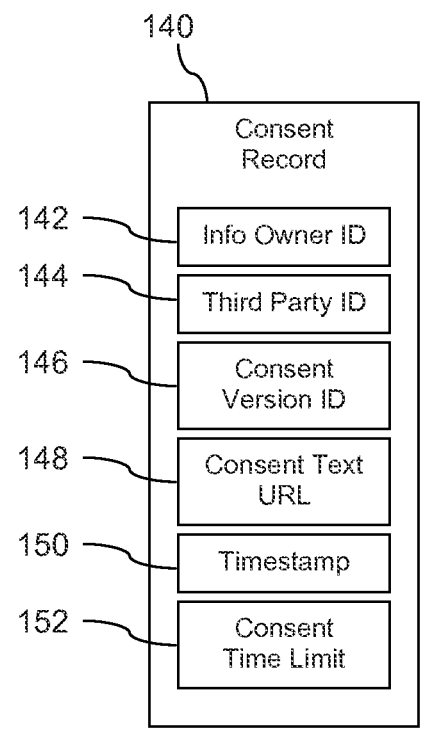
FIG. 2 is a block diagram of a consent record according to an embodiment of the disclosure.

Turning now to FIG. 2, a consent record 140 is described. In an embodiment, the consent record 140 comprises three or more of an information owner identity 142, a third party identity 144, a consent version identity 146, a consent text universal reference locator (URL) 148, a timestamp 150, and a consent time limit 152. In other embodiments additional information may be stored in the consent record 140. The information owner identity 142 may be one or more of a phone number (e.g., mobile phone number), a name, an address, or an account number of the information owner. Different consent records 140 may have different types of information owner identities, for example when the consent records 140 are sent to the consent management application 124 from different third parties 110. A third party 110 that is a bank may provide a name of the information owner and an account number as the information owner identity 142. By contrast, a third party application 118 installed on the first UE 102a may provide a phone number of the information owner as the information owner identity 142. The third party identity 144 may be a name of a responsible business or organization, for example a mobile application provider distributor, a financial institution, or an Internet commerce enterprise (which may also be referred to in some contexts as an on-line retail web site business). All of these may be referred to as third parties 110. The third party identity 144 may be a registration number of a business or an organization that has registered with the consent management hub 122 to collaborate with and cooperate with management of consents.

The consent version identity 146 may be a version identifier such as version 1.4, version 2.5, version 3 (d), and the like. The content version identity 146 may be a versioning identifier peculiar to a third party 110. The consent text URL 148 may be a link that provides a way for accessing the text of the consent that the user granted. In some contexts the text of the consent may be referred to as the text of the consent agreement. The timestamp 150 is a representation of the time that the user granted the subject consent. This may be referred to in some contexts as a consent event timestamp. The consent time limit 152 is a representation of the duration of time for which the granted consent is valid. Different third parties 110 may provide consent time limits 152 in different types of format. For example, a first third party 110 may provide a time limit that runs from the timestamp 150. Alternatively, a second third party 110 may provide a time limit that indicates the date the consent expires.

Returning now to FIG. 1, further details of the system 100 are described. The consent management hub 122 and/or the consent management application 124 may provide an API for third parties 110 to access functions provided by the consent management hub 122. For example, a third party 110 may use the API to send a consent record 140 to the consent management hub 122 to be managed and stored in the data store 126. As an example, the third party 110 may be a mobile application provider of a third party application 118 installed on the first UE 102a. The user may have downloaded the third party application 118 from an application store managed by his or her wireless service provider. The wireless service provider may oblige mobile application providers to comply with a user consent management regime as a condition of admission to their application store. The consent management regime may mandate sending consent records 140 to the consent management hub 122 on the event of a consent grant. As another example, the third party 110 may be a financial institution, and the financial institution may be obligated by government regulations or by commercial best practices to comply with the consent management regime.

The consent management application 124 may further provide an interface for owners of confidential information to manage their consents. For example, an owner of confidential information may log into a web site provided by the consent management hub 122. The information owner may identify himself or herself in a variety of different ways and in a plurality of different ways. The information owner may further provide an authentication token of the information owner, for example a personal identification number (PIN). The consent management application 124 can then search the data store 126 to read all the consent records 140 stored in the data store 126 that are associated with the information owner.

The information owner consent management web page may provide multiple ways for an information owner to review his or her consents. For example, all the consents may be presented in the web page or in a screen or window of the web page, one line per consent, in order of timestamp, from latest to oldest or from oldest to latest, one screen at a time, if the consents take up more than one screen to display all consent. Alternatively, the information owner may select or enter time ranges, and consents with timestamps that fall into the time ranges may be presented, one screen at a time. The information owner consent management web page may provide controls to select display of consents according to different categories or classes of consent. For example, the web page may provide a control to select consents from a location sharing class of consents, from a credit card information storing class of consents, from a transmit to the network class of consents, from a execute commands on hardware devices of a smart phone class of consents, from a contact a person class of consents, and the like. The information owner consent management web page may provide controls to select display of consents granted by the information owner according to different categories or classes of third parties. For example, the web page may provide a control to select consents granted by the information owner to an internet commerce enterprise class of third parties, to select consents granted by the information owner to a mobile application provider class of third parties, to select consents granted by the information owner to a wireless communication service provider class of third parties, and to select consents granted by the information owner to a financial institution class of third parties.

Each line of the consent display screen may provide summary information about a consent, for example an identification of the third party 110, a date of the consent event, and an indication of the nature of the consent. The nature of the consent may be indicated by a symbol representing a class of consent. The information owner may see further details about a consent by clicking on the summary line associated with the consent. A details screen or window may be presented in the web page that provides further details about the consent. The consent management application 124 (or web application supporting the information owner consent management web page) may use the consent text URL 148 to retrieve the text of the consent. The text of the agreement may be provided to the details screen by the consent management application 124, for example as an updated screen of HTML content or otherwise.

The information owner consent management web page may further provide controls that the information owner may use to cancel, revoke, or rescind consents. When the information owner cancels a consent identified by a consent record 140, the consent management application 124 messages with the appropriate third party 110 to inform the third party 110 to delete the subject consent. The third parties 110 may provide an API to the consent management application 124 to request the revocation or deletion of consents.

The consent management application 124 may allow an information owner to review and manage consents associated with a plurality of UEs 102, for example to a primary subscriber on a group wireless communication service account such as a parent of a family or a head of a business. The information owner consent management web page may provide commands to manage consents across a plurality of UEs 102. In such cases where an information owner has authority over consents granted by a plurality of UEs 102, the consent record 140 may further have a user identity that is independent of the information owner identity 142. For example, the consent record 140 may identify the information owner identity 142 as Robert Brown while the user identity is John Smith.

In an embodiment, the consent management application 124 may provide an API for use by third parties 110 to notify the consent management application 124 that an information owner has changed his or her wireless communication service provider. When the third party 110 sends a request to the API of the consent management application 124, for this and/or for other services, the third party 110 may provide an authentication token that is unique to the third party 110. It may be customary or mandated for some third parties 110 (e.g., mobile application providers) to delete all consents associated with an information owner on the event of the information owner changing his or her wireless service provider.

On notification by a third party 110 that an owner of confidential information has changed his or her service provider, the consent management application 124 may send a message to the information owner prompting him or her to choose to extend consents previously of record or to not extend consents. The message may identify specific consents that otherwise will be revoked or already are revoked. If the information owner chooses to extend consents, the consent management application 124 may identify consent records of the information owner subject to or already revoked pursuant to the change of wireless service provider. The consent management application 124 may invoke an API of the one or more involved third parties 110 to restore the former consent. Alternatively the API may be used by third parties 110 to request the consent management application 124 to prompt the information owner to extend or renew consents formerly of record.

In an embodiment, the first UE 102a may further comprise a consent monitor application 120. The consent monitor application 120 may monitor the action of third party applications 118 and compare these actions to consents granted by the information owner or user associated with the first UE 102a, for example consents granted to third parties 110 (i.e., mobile application providers) associated with the third party applications 118. The consent monitor application 120 may determine a status of consents to grant access to or to release confidential information to the third party applications and take action in response to determining that the status of consent is not granted to grant access to or release confidential information that a third party application 118 has in fact attempted to access and/or release.

The consent monitor application 120 may be embedded in an operating system of the first UE 102a and may receive notification or otherwise be informed when third party applications 118 make calls to the operating system, for example to command hardware devices on the first UE 102a, to transmit over the cellular transceiver 112 or a short range radio transceiver (not shown), or to read from a system utility such as a contacts dictionary. Alternatively, the consent monitor application 120 may be installed outside of the operating system and outside of a system memory portion of the memory 116 but be granted special access permissions by the operating system by virtue of having been configured with a digital certificate carrying special access privileges. The digital certificate may be configured by a wireless service provider that provides wireless communication service to the first UE 102a.

The consent monitor application 120 may store information about the consents associated with the third party applications 118 in the memory 116. The consent monitor application 120 may invoke an API of the consent management application 124 to read consent records 140 stored in the data store 126 associated with the third party applications 118 and/or third parties 110 associated with the third party applications 118. Alternatively, the consent management application 124 may transmit information about new consent records on the event that they are received from third parties 110 and written into the data store 126.

When the consent monitor application 120 determines that a third party application 118 is taking action that violates the consent or consents granted to the third party application 118 by the information owner or user of the UE 102a, the consent monitor application 120 may take action. Taking action by the consent monitor application 120 may include blocking the subject action by the third party application 118. Alternatively, taking action by the consent monitor application 1204 may allow the subject action by the third party application 118 to continue but may provide some form of notification to the first UE 102a and/or the information owner or user associated with first UE 102a. The consent monitor application 120 may send a text message or an email to the information owner or user identifying the consent violation by the third party application 118. The consent monitor application 120 may place a notification about the consent violation in a notification tray of the interface of the first UE 102a. The consent monitor application 120 may pop-up a dialog box on a screen of the first UE 102a, for example in a display window associated with the subject third party application 118, identifying the consent violation by the third party application 118. Based on this information, the information owner may decide to delete the subject third party application 118. Alternatively, the consent monitor application 120 may take a hybrid action: the consent monitor application 120 may suspend the execution of the third party application 118 and pop-up a dialog box notifying the information owner or user of the consent violation and providing one or more controls for responding to the consent violation. The responses may be to ignore (e.g., to allow the action in the present case), which may be referred to as providing an acknowledge input in some contexts, the consent violation, to prevent the action in the present case, or to prevent the action and to automatically delete or uninstall the third party application 118.

In an embodiment, the consent management hub 122 and/or the consent management application 124 may be collaboratively coupled to the consent monitor application 120. For example, the consent monitor application 120 may be a client application that is known to the consent management application 124 or is granted a privileged interface to the consent management application 124. The consent monitor application 120 may provide periodic reports to the consent management application 124 about consent violation events associated with third party applications 118. The consent management application 124 or an organization that manages the consent management hub 122 may discipline third parties 110 that are determined to violate consent agreements or are reported for consent violations in excess of a predefined threshold or in excess of a predefined rate of consent violations or in excess of a predefined ratio of consent violations to opportunities to violate consent agreements.

In an embodiment, the consent monitor application 120 may provide a user interface on the first UE 102a that can be used to define more finely grained consents. For example, an information owner may grant access to the contacts of the first UE 102a to a third party application 118 but restrict that access to phone numbers only and forbid access to email addresses or home addresses. For example, the information owner may grant access to the contacts of the first UE 102a, but one record at a time and based on the third party application 118 providing a name for which a phone number is desired. For example, the information owner may grant access to transmit information via the cellular transceiver 112 but only while the subject third party application 118 is executing in the foreground, for example when a user is currently playing a game provided by a third party application 118. The consent monitor application 120 may take action when these more finely grained consents are violated as described further above.

Figure 3:
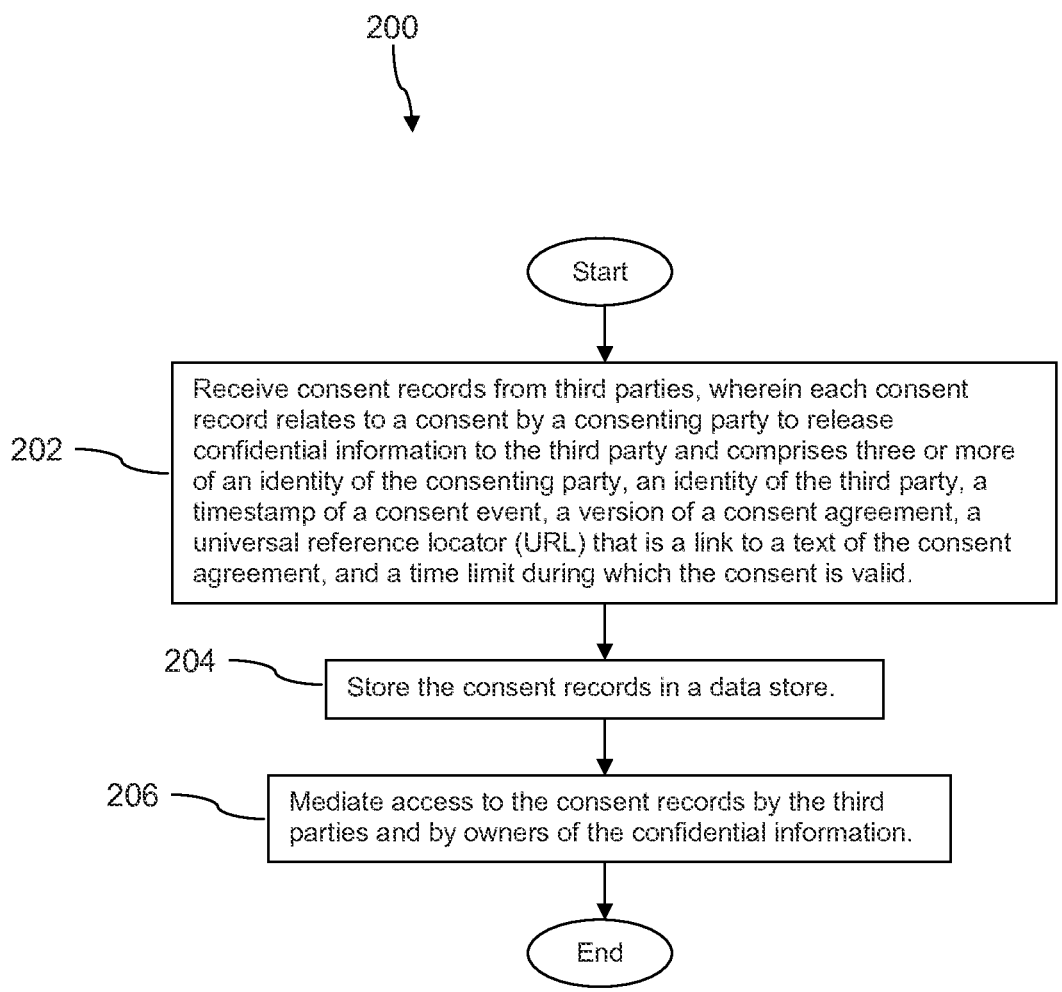
FIG. 3 is a flow chart of a method according to an embodiment of the disclosure.

Turning now to FIG. 3, a method 200 is described. The method 200 may be executed by a consent management hub 122 or a consent management hub server. At block 202, consent records from third parties are received (e.g., received by the consent management hub server), wherein each consent record relates to a consent by a consenting party to release confidential information to the third party and comprises three or more of an identity of the consenting party, an identity of the third party, a timestamp of a consent event, a version of a consent agreement, a universal reference locator (URL) that is a link to a text of the consent agreement, and a time limit during which the consent is valid. At block 204, the consent records are stored in a data store (e.g., the consent management hub server stores the consent records in the data store). At block 206, access to the consent records by the third parties and owners of the confidential information is mediated. For example, the consent management hub server mediates access to the consent records via an application programming interface provided by the consent management hub server for third parties and owners of the confidential information to access the consent records.

Figure 4:
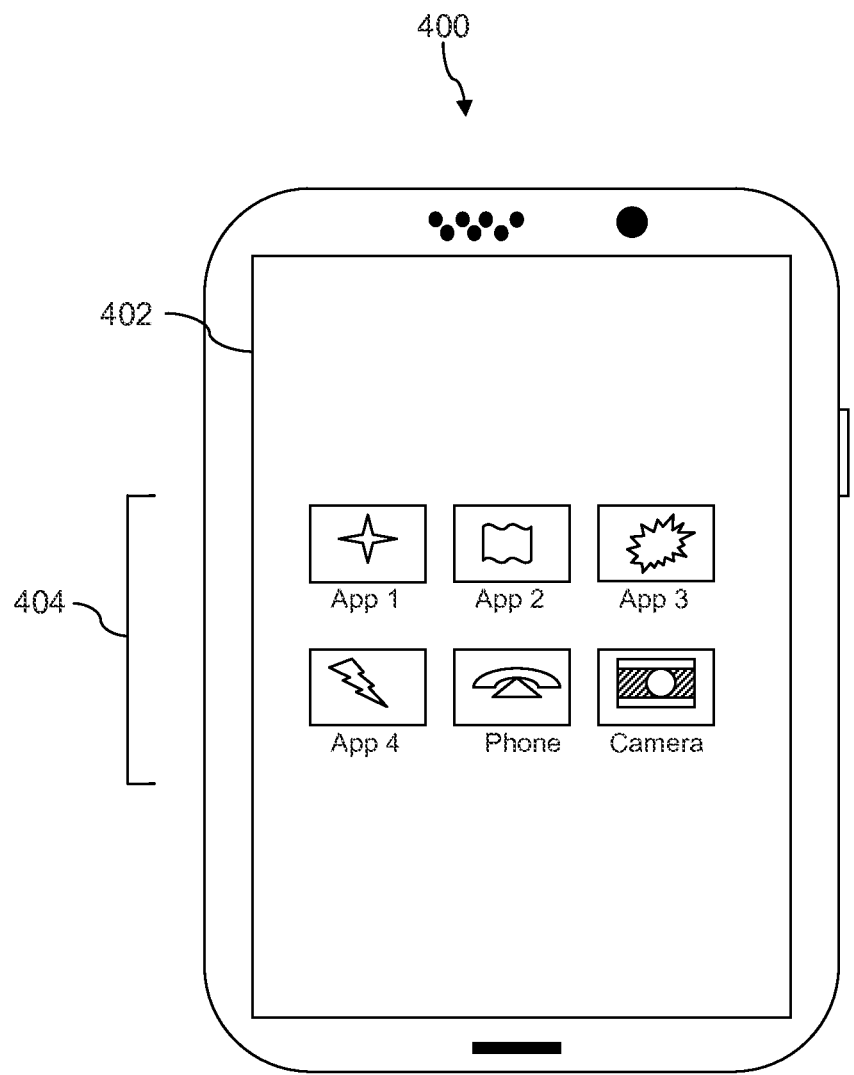
FIG. 4 is an illustration of a smart phone according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
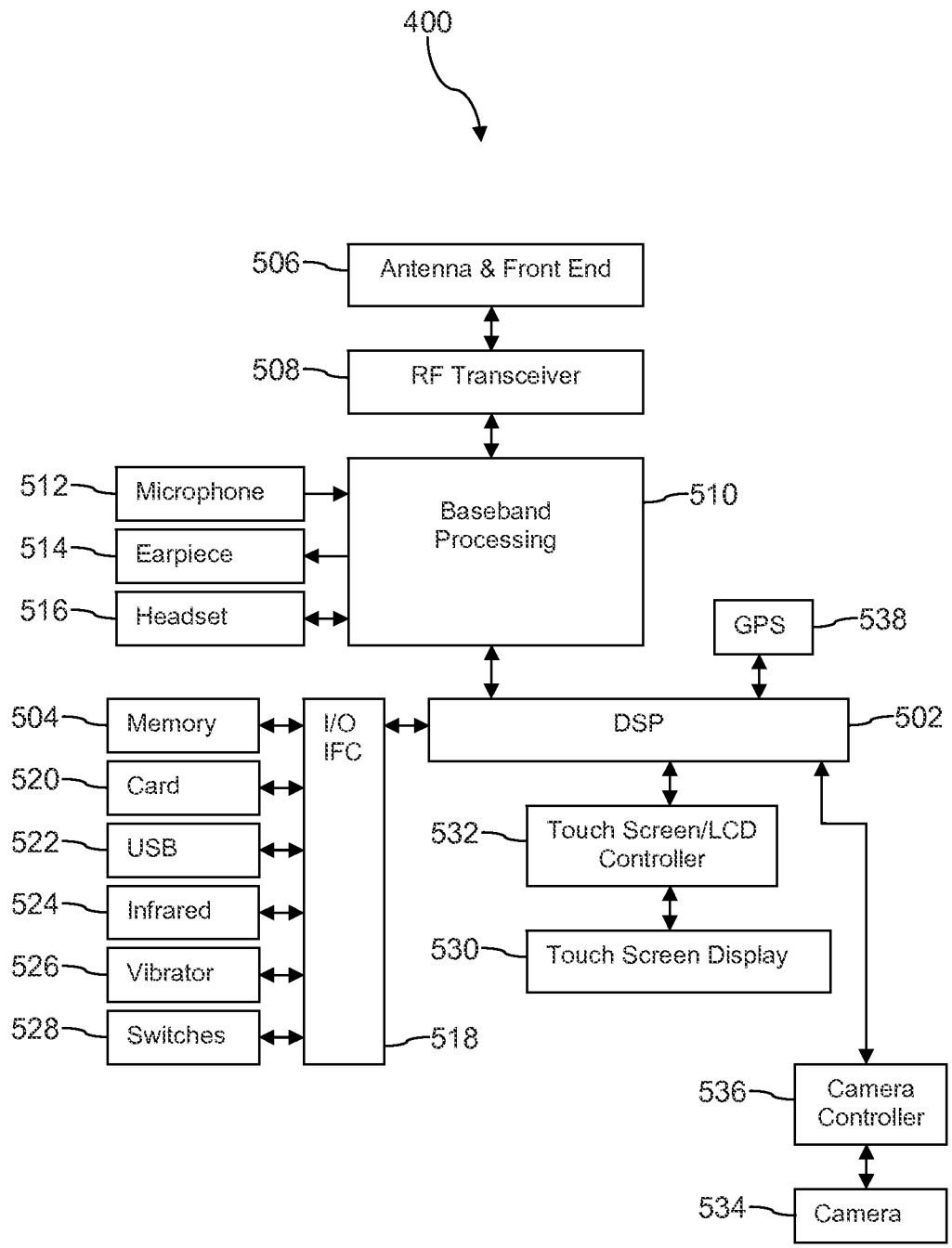
FIG. 5 is a block diagram of a hardware architecture of a smart phone according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
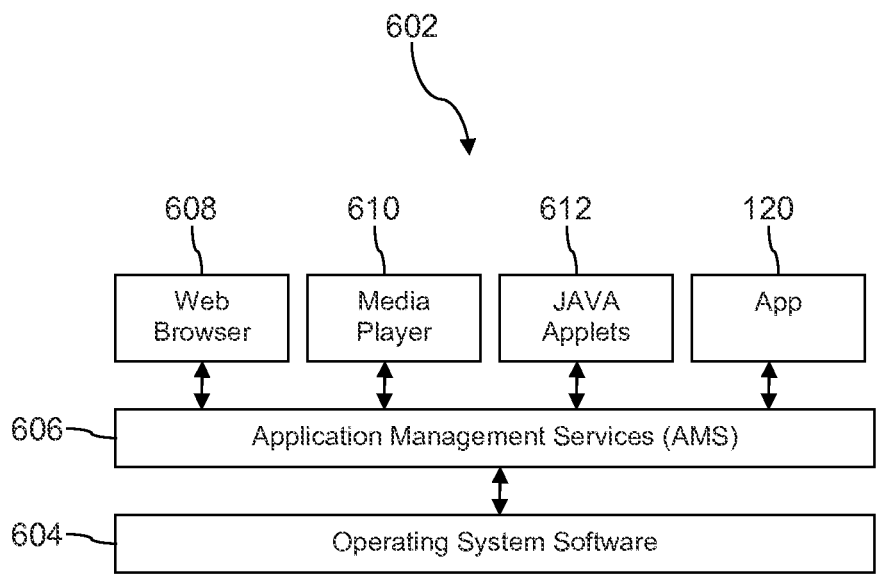
FIG. 6A is a block diagram of a software architecture of a smart phone according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, JAVA applets 612, and a consent monitor application 120, as referenced to above in FIG. 1. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
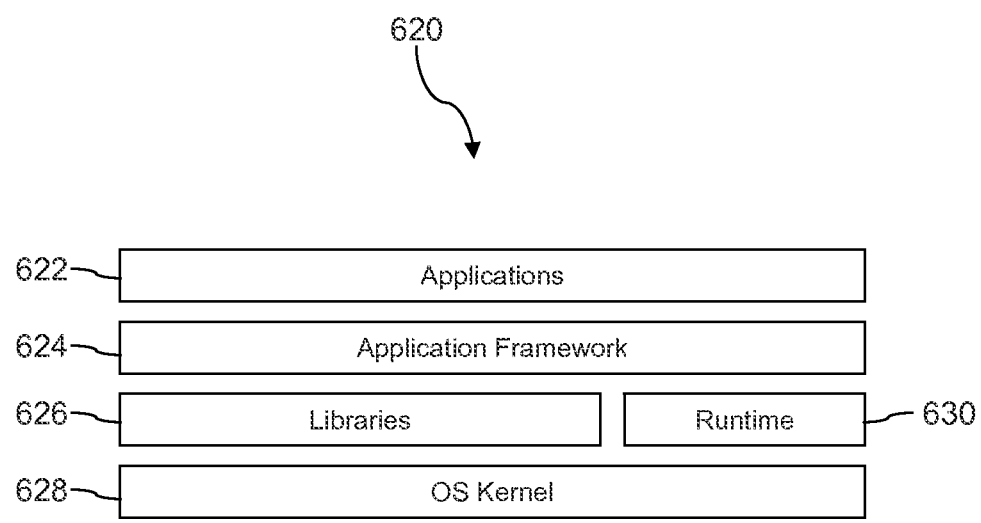
FIG. 6B is a block diagram of another software architecture of a smart phone according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
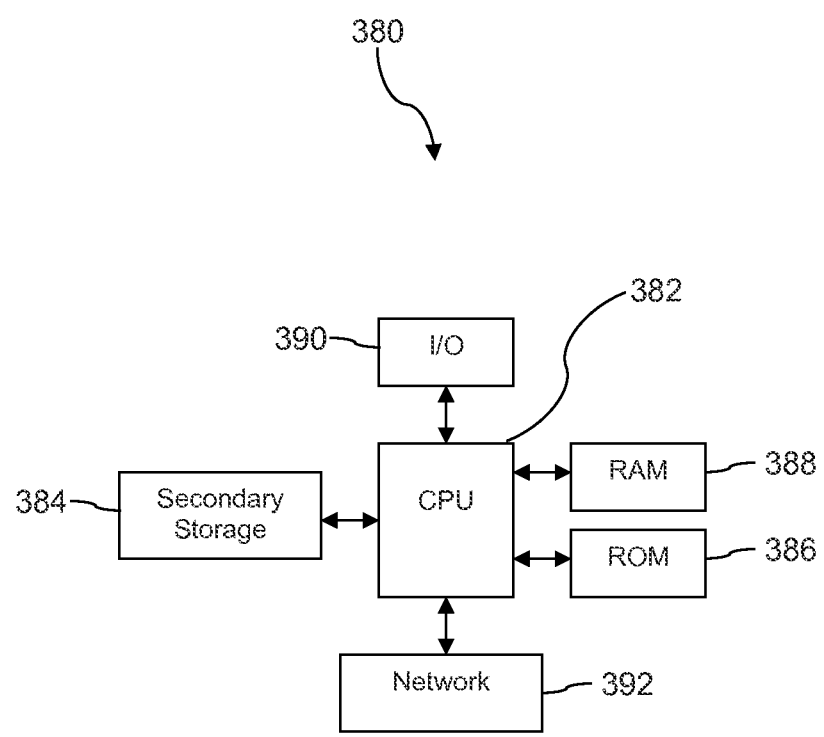
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
  a consent management hub configured to manage consents associated with a plurality of user devices and a plurality of third party applications from a plurality of third parties; and
  a user equipment (UE) located remote to the consent management hub and included among the plurality of user devices, comprising:
    a cellular radio transceiver;
    a non-transitory memory;
    a processor;
    a third party application, from among the plurality of third party applications, stored in the non-transitory memory that, when executed by the processor, causes the processor to attempt to access confidential information of the UE; and
    an application stored in the non-transitory memory that, when executed by the processor, causes the processor to:
      obtain consents associated with the third party application for at least the UE from the consent management hub, the consents at least including consent for the third party application to access the confidential information of the UE;
      determine a status of consent to release confidential information to the third party application based on the consents obtained from the consent management hub,
      take action in response to a determination that the status of consent is not granted to release confidential information to the third party application;
      responsive to receiving a request by the third party application to access the confidential information and determining that the request by the third party application to access the confidential information exceeds the consents associated with the third party application previously obtained by the UE from the consent management hub, presenting a user interface element to obtain consent from a user of the UE for access by the third party application to the confidential information;
      responsive to obtaining the consent from the user, transmitting the consent to the consent management hub to modify the consents managed by the consent management hub and associated with the plurality of user devices and the plurality of third party applications from the plurality of third parties; and generating and presenting a consents interface displaying the consents managed by the consent management hub and associated with the plurality of user devices and the plurality of third party applications from the plurality of third parties, wherein the consents interface orders the consents according to a timestamp of the consents.

2. The user equipment of claim 1, wherein the action comprises blocking the release of confidential information of the UE to the third party application.

3. The user equipment of claim 1, wherein the action comprises one of presenting a notification on a display screen of the UE, adding a notification to a notification tray of the UE, or sending a text message to the UE.

4. The user equipment of claim 3, wherein the action further comprises suspending execution of the third party application until the UE receives an acknowledge input.

5. The user equipment of claim 1, wherein the application monitors calls by the third party application to application programming interfaces (APIs) provided by two or more of a self-location function of the UE, a contacts function of the UE, a camera function of the UE, a microphone function of the UE, and an email function of the UE, and wherein the application determines the status of consent responsive to detecting that the third party application calls one of the APIs.

6. The user equipment of claim 5, wherein the application is embedded in an operating system of the UE.

7. The user equipment of claim 5, wherein the application is stored in a portion of the non-transitory memory outside of a system memory partition and the application is provisioned with a digital certificate that it presents to an operating system of the UE recognizes to execute privileged commands that enable the application to monitor calls by the third party application to the APIs.

8. The user equipment of claim 1, wherein the application stores information about consents associated with third party applications including one or more consents associated with the third party application.

9. The user equipment of claim 8, wherein the application invokes an application program interface to read consent records stored in a data store associated with the third party applications to determine the information about the consents associated with the third party applications.

10. The user equipment of claim 8, wherein the application receives the information about the consents associated with the third party applications from a content management application stored and executed on a content management hub.

11. The user equipment of claim 8, wherein the application further monitors one or more actions of the third party application.

12. The user equipment of claim 11, wherein the application determines the status of consent by comparing the one or more actions of the third party application to the information about the one or more consents associated with the third party application.

13. The user equipment of claim 12, wherein the application determines that the status of consent is not granted to release confidential information to the third party application in response to determining, based on the comparing, that the one or more actions exceed the one or more consents associated with the third party application.

14. The user equipment of claim 8, wherein the application monitors calls by the third party application to one or more application programming interfaces (APIs) provided by one or more of a self-location function of the UE, a contacts function of the UE, a camera function of the UE, a microphone function of the UE, and an email function of the UE and the application.

15. The user equipment of claim 14, wherein the application determines the status of consent by comparing monitored calls to the information about the one or more consents associated with the third party application.

16. The user equipment of claim 15, wherein the application determines that the status of consent is not granted to release confidential information to the third party application in response to determining, based on the comparing, that the monitored calls exceed the one or more consents associated with the third party application.

17. The user equipment of claim 5, wherein the application determines the status of consent by comparing monitored calls to the information about the one or more consents associated with the third party application.

18. The user equipment of claim 17, wherein the application determines that the status of consent is not granted to release confidential information to the third party application in response to determining, based on the comparing, that the monitored calls exceed the one or more consents associated with the third party application.

19. The user equipment of claim 1, wherein the application provides a periodic report to a consent management application stored and executed on a content management hub about consent violation events associated with the third party application.

* * * * *